(12) United States Patent
Yonezawa (10) Patent No.: US 9,285,567 B2
(45) Date of Patent: Mar. 15, 2016

(54) IMAGING LENS AND IMAGING APPARATUS

(71) Applicant: FUJIFILM CORPORATION, Tokyo (JP)

(72) Inventor: Masaru Yonezawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/595,248

(22) Filed: Jan. 13, 2015

(65) Prior Publication Data

US 2015/0205077 A1    Jul. 23, 2015

(30) Foreign Application Priority Data

Jan. 17, 2014  (JP) .................... 2014-006642

(51) Int. Cl.
*G02B 13/04* (2006.01)
*G02B 13/06* (2006.01)
*G02B 13/00* (2006.01)

(52) U.S. Cl.
CPC .............. *G02B 13/06* (2013.01); *G02B 13/006* (2013.01)

(58) Field of Classification Search
CPC .. G02B 13/04; G02B 13/0045; G02B 15/177; G02B 13/006; G02B 5/005; G02B 13/06; G02B 13/009; G02B 15/161; G03B 37/04
See application file for complete search history.

(56) References Cited

U.S. PATENT DOCUMENTS

| 7,667,901 | B2 | 2/2010 | Baba |
| 2012/0120505 | A1 | 5/2012 | Nakai et al. |
| 2013/0329305 | A1* | 12/2013 | Kunugise ............... G02B 15/14 359/691 |

FOREIGN PATENT DOCUMENTS

| JP | 2011-242520 | 12/2011 |
| JP | 4929770 | 5/2012 |
| JP | 2012-108302 | 6/2012 |

* cited by examiner

*Primary Examiner* — Alicia M Harrington
(74) *Attorney, Agent, or Firm* — Young & Thompson (57) ABSTRACT

An imaging lens consisting of a front group, a stop, and a rear group. The first and the second lenses from the object side in the front group are a negative meniscus lens with a convex surface on the object side and a negative lens respectively. The first and the second lenses from the image side in the front group are both positive lenses. The rear group is composed of a positive lens, a negative lens, and one or more positive lenses disposed in order from the object side. If the maximum total angle of view when an object at infinity is in focus is taken as $2\omega$, the imaging lens satisfies a conditional expression, $2\omega>130°$.

14 Claims, 7 Drawing Sheets

EXAMPLE 1

FIG.1

EXAMPLE 1

FIG.2

EXAMPLE 2

FIG.7

IMAGING LENS AND IMAGING APPARATUS

CROSS-REFERENCE TO RELATED APPLICATIONS

The present application claims priority under 35 U.S.C. §119 to Japanese Patent Application No. 2014-006642 filed on Jan. 17, 2014. The above application is hereby expressly incorporated by reference, in its entirety, into the present application.

BACKGROUND OF THE INVENTION

1. Field of the Invention

The present invention relates to an imaging lens and an imaging apparatus, and more specifically to an imaging lens that can be favorably used, for example, in digital cameras, surveillance cameras, and vehicle cameras, and an imaging apparatus equipped with the imaging lens.

2. Description of the Related Art

Heretofore, image sensors such as, for example, a CCD (Charge Coupled Device) and a CMOS (Complementary Metal Oxide Semiconductor) have been used for the imaging devices in the aforementioned fields and, as lens systems that can be used in such imaging devices, those described, for example, in Japanese Unexamined Patent Publication No. 2011-242520, Japanese Unexamined Patent Publication No. 2012-108302 and Japanese Patent No. 4929770 are known. The lens system described in each of Japanese Unexamined Patent Publication No. 2011-242520, Japanese Unexamined Patent Publication No. 2012-108302 and Japanese Patent No. 4929770 includes a front group composed of a plurality of lenses, a stop, and a rear group composed of a plurality of lenses.

SUMMARY OF THE INVENTION

The imaging lenses used in the imaging devices in the aforementioned fields need to be compact, and have a small F-number and a wide angle of view. In addition, as the trend toward higher pixel counts has recently been moving ahead for image sensors installed in cameras, a high performance imaging lens that conforms to higher pixel counts and can obtain a high resolution image is demanded.

The lens system described in Japanese Unexamined Patent Publication No. 2011-242520, however, cannot be said to be sufficiently downsized because of a long overall lens length. The lens system described in Japanese Unexamined Patent Publication No. 2012-108302 requires improvement if it is used with an image sensor, as the incident angle of a light ray incident on the image plane is large at a peripheral angle of view. In the lens system described in Japanese Patent No. 4929770, spherical aberration is under-corrected and the F-number is not sufficiently small.

The present invention has been developed in view of the circumstances described above, and it is an object of the present invention to provide an imaging lens having a wide angle of view, yet reduced in overall lens length, having a small F-number, suppressed in incident angle of a light ray incident on the image plane at a peripheral angle of view, and having high optical performance that conforms to image sensors of advanced pixel count.

An imaging lens of the present invention substantially consists of a front group, a stop, and a rear group, disposed in order from the object side, in which the first and the second lenses from the object side in the front group are a negative meniscus lens with a convex surface on the object side and a negative lens respectively, the first and the second lenses from the image side in the front group are both positive lenses, the first and the second lenses from the object side in the rear group are a positive lens and a negative lens respectively, the rear group includes one or more lenses on the image side of the second lens from the object side, the one or more lenses being both positive lenses, and the imaging lens satisfies a conditional expression (1) given below:

$$2\omega > 130° \qquad (1)$$

where $2\omega$: maximum total angle of view when an object at infinity is in focus.

In the imaging lens of the present invention, the rear group preferably has a four-lens configuration, composed of a positive lens, a negative lens, a positive lens, and a positive lens, disposed in order from the object side.

Further, in the imaging lens of the present invention, the first and the second lenses from the image side in the front group are preferably cemented with each other.

Still further, in the imaging lens of the present invention, the first lens from the image side in the front group is preferably a positive meniscus lens with a convex surface on the image side.

Further, in the imaging lens of the present invention, the first and the second lenses from the object side in the rear group are preferably cemented with each other.

Still further, in the imaging lens of the present invention, the front group preferably has a five-lens configuration, composed of a negative meniscus lens, a negative lens, a negative lens, a positive lens, and a positive lens, disposed in order from the object side.

Further, the imaging lens of the present invention preferably satisfies any one or any combination of conditional expressions (2) to (5) and (2-1) to (4-1) given below:

$$10 < \nu Ar1 - \nu Ar2 < 60 \qquad (2)$$

$$10 < \nu Ar1 - \nu Ar2 < 40 \qquad (2-1)$$

$$20 < \nu Bp - \nu Bn < 70 \qquad (3)$$

$$30 < \nu Bp - \nu Bn < 60 \qquad (3-1)$$

$$2 < (DAr1 + DAr2)/f < 4 \qquad (4)$$

$$2 < (DAr1 + DAr2)/f < 3.5 \qquad (4-1)$$

$$TL/f < 20 \qquad (5)$$

where $\nu Ar1$: Abbe number of the first lens from the image side in the front group with respect to the d-line, $\nu Ar2$: Abbe number of the second lens from the image side in the front group with respect to the d-line, $\nu Bp$: Abbe number of the first lens from the object side in the rear group with respect to the d-line, $\nu Bn$: Abbe number of the second lens from the object side in the rear group with respect to the d-line, f: focal length of the entire system, DAr1: center thickness of the first lens from the image side in the front group, DAr2: center thickness of the second lens from the image side in the front group, and TL: distance on the optical axis from the most object side surface of the front group to the image plane when an object at infinity is in focus.

The foregoing "substantially" in the context of "substantially consists of" intends that the imaging lens may include a lens having substantially no refractive power, an optical element other than a lens, such as a stop, a cover glass, and the like, a lens flange, a lens barrel, and a mechanical component, for example, a camera shake correction mechanism, in addition to the constituent elements.

The surface shapes and the signs of refractive powers of the aforementioned lenses are considered in the paraxial region if they include aspherical surfaces.

An imaging apparatus of the present invention is equipped with the imaging lens of the present invention.

According to the present invention, in a lens system consisting of a front group, a stop, and a rear group, disposed in order from the object side, the lenses of each lens group are optimally formed to satisfy given conditional expressions. This allows provision of an imaging lens having a wide angle of view, yet reduced in overall lens length, having a small F-number, suppressed in incident angle of a light ray incident on the image plane at a peripheral angle of view, and having high optical performance that conforms to image sensors of advanced pixel count, and an imaging apparatus equipped with the imaging lens.

DESCRIPTION OF THE PREFERRED EMBODIMENTS

Hereinafter, embodiments of the present invention will be described with reference to the accompanying drawings.

Figure 1:
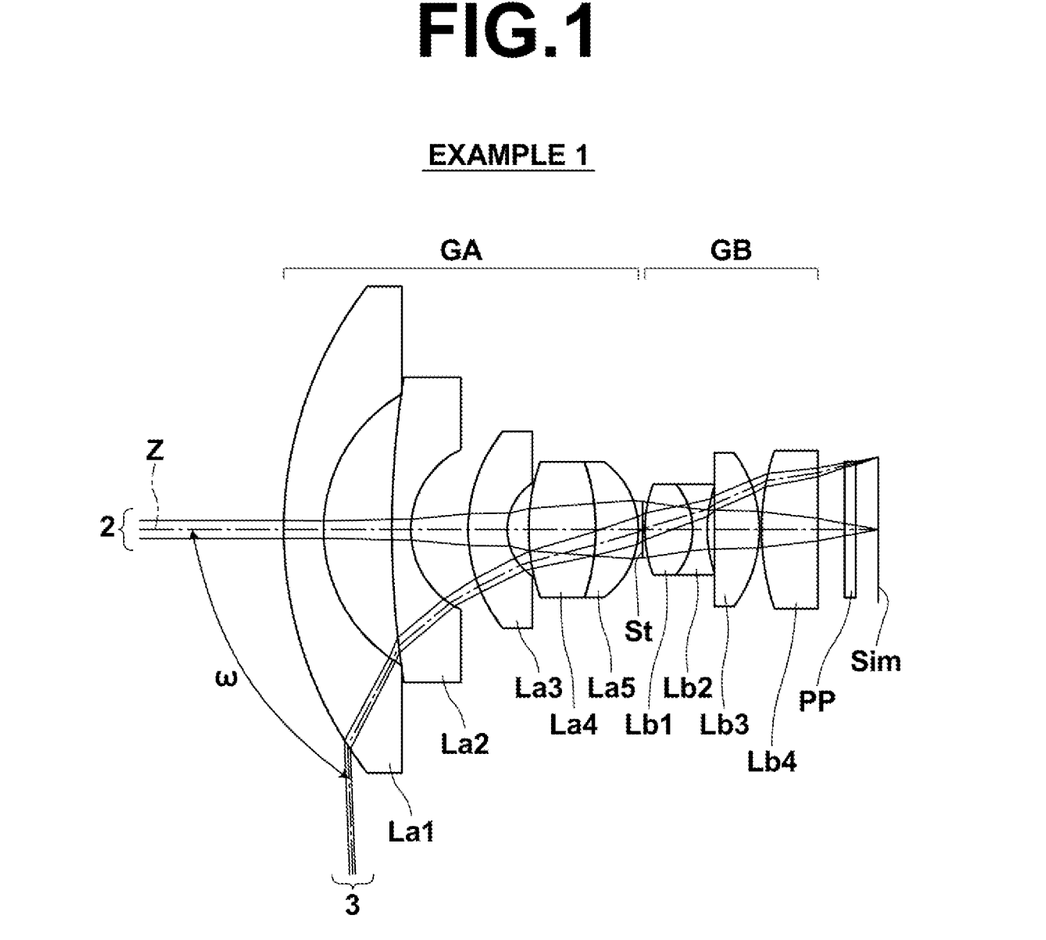
FIG. 1 is a cross-sectional view of an imaging lens of Example 1, illustrating the configuration and optical paths thereof.
Figure 2:
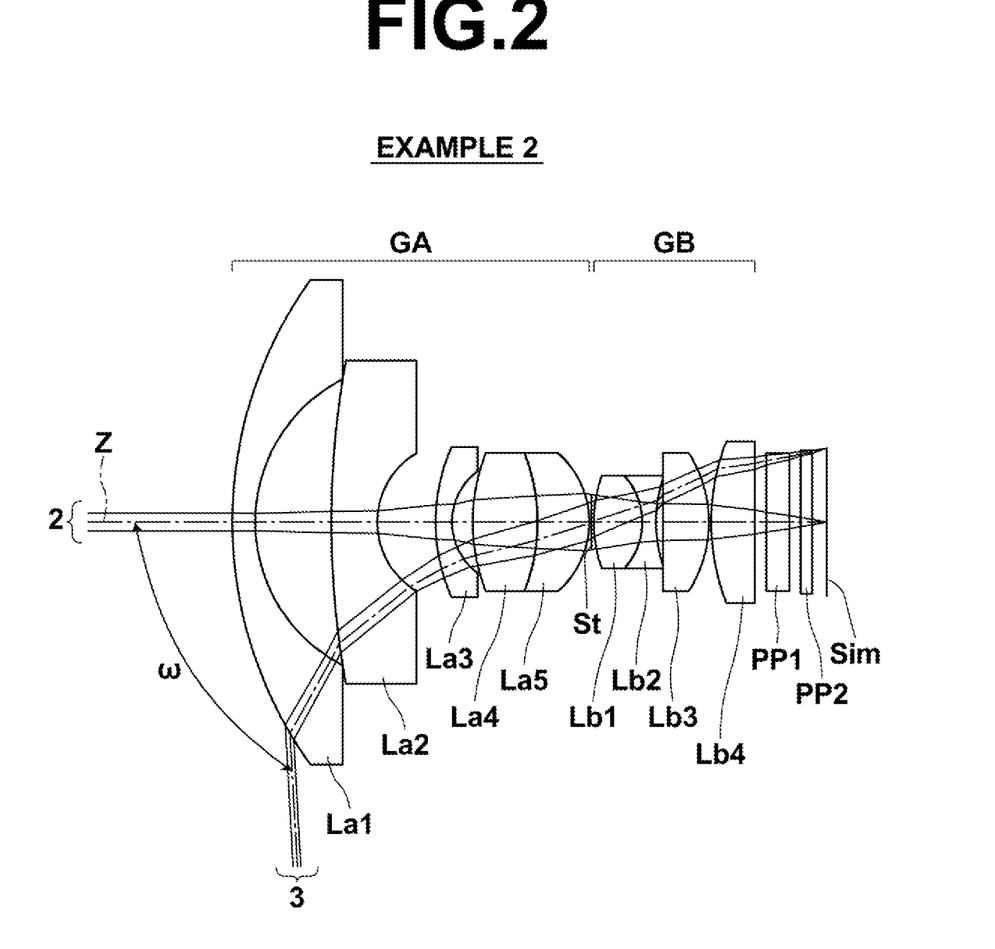
FIG. 2 is a cross-sectional view of an imaging lens of Example 2, illustrating the configuration and optical paths thereof.
Figure 3:
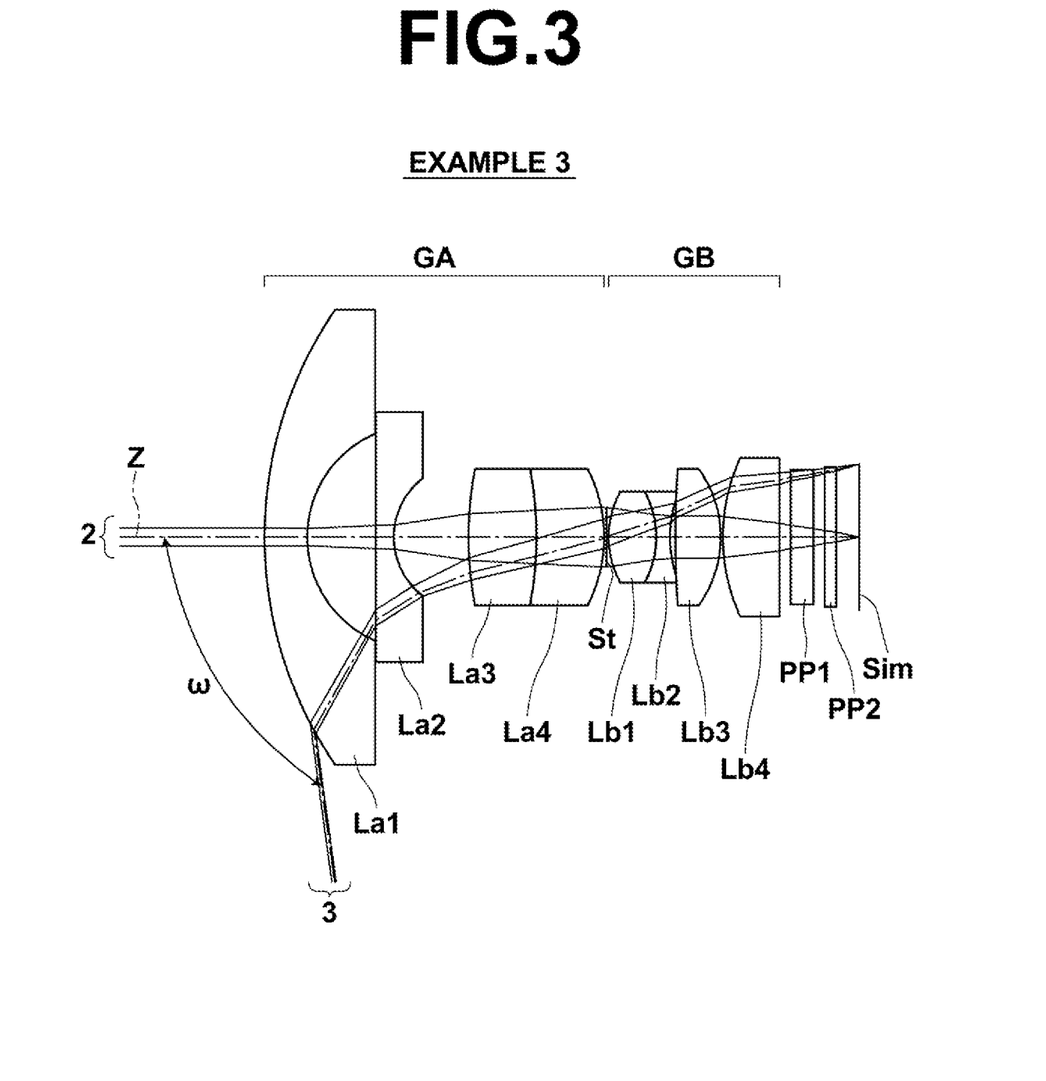
FIG. 3 is a cross-sectional view of an imaging lens of Example 3, illustrating the configuration and optical paths thereof.

FIG. 1 is a cross-sectional view of an imaging lens according to one embodiment of the present invention, illustrating the configuration and optical paths thereof. The example illustrated in FIG. 1 corresponds to Example 1 to be described later. Likewise, configurations and optical paths of imaging lenses corresponding to Examples 2 and 3 are shown in FIGS. 2 and 3 respectively in cross-section. As the basic configurations and illustration methods of the examples illustrated in FIGS. 1 to 3 are identical, a description will be made, hereinafter, with reference to the example illustrated in FIG. 1. In FIG. 1, the left side is the object side and the right side is the image side, and FIG. 1 also illustrates an axial light beam 2, an off-axis light beam 3 of the maximum angle of view, and a half value ω of the maximum angle of view when an object at infinity is in focus.

The imaging lens substantially consists of a front group GA, an aperture stop St, and a rear group GB, disposed in order from the object side along the optical axis Z. In the example illustrated in FIG. 1, the front group GA is composed of lenses La1 to La5, disposed in order from the object side, and the rear group GB is composed of lenses Lb1 to Lb4, disposed in order from the object side. Note that, however, in the imaging lens of the present invention, the number of lenses of the front group GA and the lens shapes, and the number of lenses of the rear group GB and the lens shapes are not limited to those shown in FIG. 1. The aperture stop St illustrated in FIG. 1 does not necessarily indicate the size or shape but the position on the optical axis Z.

FIG. 1 illustrates an example in which a parallel plate optical member PP is disposed between the most image side lens surface and the image plane Sim. As it is conceivable that, when the imaging lens is installed in an imaging apparatus, a cover glass for protecting the image sensor, a various types of filters, such as a low-pass filter, an infrared cut filter, or the like are provided according to the specifications of the imaging apparatus, the optical member PP assumes these. But a configuration without the optical member PP is also possible in the present invention.

A negative meniscus lens with a convex surface on the object side is disposed on the most object side in the front group GA. The disposition of a lens having a negative refractive power on the most object side of the entire system is advantageous for increasing the angle of view. Further, the disposition of a meniscus lens with a convex surface on the object side on the most object side in the entire system allows the generation of astigmatism to be suppressed.

The second lens from the object side in the front group GA is a negative lens. The use of a negative lens as the second lens from the object side in the entire system is advantageous for increasing the angle of view. The use of negative lenses as the first and the second lenses from the object side in the front group GA allows a negative refractive power required to increase the angle of view to be obtained. The disposition of two negative lenses in series on the most object side in the entire system is advantageous for increasing the angle of view.

A positive lens is disposed on the most image side in the front group GA. This allows spherical aberration, longitudinal chromatic aberration, and field curvature to be corrected satisfactorily and the overall lens length to be reduced favorably. The most image side lens in the front group GA is preferably a positive meniscus lens with a convex surface on the image side, and if that is the case, spherical aberration may be corrected more satisfactorily.

The second lens from the image side in the front group GA is a positive lens. This allows spherical aberration, lateral chromatic aberration, and field curvature to be corrected satisfactorily and the overall lens length to be reduced favorably.

The overall lens length of the imaging lens may be reduced by taking a retrofocus type configuration as the entire lens system and using positive lenses as the first and the second lenses from the object side in the front group GA.

The first and the second lenses from the image side in the front group GA are preferably cemented with each other. The cementing of these lenses may contribute to the reduction in overall lens length and may prevent the diameter of the most object side lens from increasing, whereby the lens system may be downsized and assembling stability may be improved.

For example, the front group GA may have a five-lens configuration, composed of a negative meniscus lens, a negative lens, a negative lens, a positive lens, and a positive lens, disposed in order from the object side. The disposition of three negative lenses in the front group GA in the manner described above allows a negative refractive power required to increase the angle of view to be secured by sharing the negative refractive power required to increase the angle of view appropriately by the three negative lenses, while suppressing the generation of astigmatism and negative distortion. If the front group GA is composed of the five lenses described above, the lateral chromatic aberration generated by the three negative lenses in the front group GA may be corrected satisfactorily by the two positive lenses in the front group GA.

A positive lens is disposed on the most object side in the rear group GB. This allows spherical aberration, longitudinal aberration, and field curvature to be corrected satisfactorily, and the overall lens length to be reduced favorably.

The second lens from the object side in the rear group GB is a negative lens. This allows spherical aberration and lateral chromatic aberration to be corrected satisfactorily.

The first and the second lenses from the object side in the rear group GB are preferably cemented with each other. The cementing of these lenses may contribute to the reduction in overall lens length and may improve assembling stability.

The rear group GB includes one or more lenses on the image side of the second lens from the object side. The one or more lenses disposed on the image side of the second lens from the object side in the rear group GB are both positive lenses. This allows the incident angle of a light ray incident on the image plane Sim to be favorably suppressed at a peripheral angle of view and the positive power of the most object side lens in the rear group GB to be prevented from increasing excessively, whereby spherical aberration may be corrected satisfactorily.

The lens configuration of the rear group GB described above is determined by considering operational advantages, to be described herein below. The rear group GB preferably includes a negative lens for correcting longitudinal chromatic aberration and lateral chromatic aberration. But, if a negative lens is disposed on the most object side in the rear group GB, a diverging effect will be given to insufficiently convergent light rays incident on the rear group GB from the front group GA. Therefore, a positive lens is preferably disposed on the most object side in the rear group GB. Further, in order to focus a light beam toward the image plane Sim, the most image side lens in the rear group GB or a lens adjacent to the image plane Sim is preferably a positive lens. Consequently, in the present invention, the rear group GB is composed of a positive lens, a negative lens, and one or more positive lenses, as described above. This configuration allows longitudinal chromatic aberration, lateral chromatic aberration, and spherical aberration to be corrected satisfactorily and the incident angle of a light ray incident on the image plane Sim to be suppressed at a peripheral angle of view.

For example, the rear group GB may have a four-lens configuration, composed of a positive lens, a negative lens, a positive lens, and a positive lens, disposed in order from the object side. If that is the case, for example, an effect of suppressing the incident angle of a light ray incident on the image plane Sim at a peripheral angle of view may be obtained by the most image side lens in the rear group GB and an effect of suppressing the generation of spherical aberration may be obtained by the second lens from the image side in the rear group GB.

More specifically, as illustrated in FIG. 1, the front group GA of the imaging lens may be composed of a negative meniscus lens with a convex surface on the object side, a negative meniscus lens with a convex surface on the object side, a negative meniscus lens with a convex surface on the object side, a biconvex lens, and a positive meniscus lens with a convex surface on the image side, disposed in order from the object side, while the rear group GB of the imaging lens may be composed of a biconvex lens, a biconcave lens, a plano-convex lens with its plane surface on the object side, and a plano-convex lens with its plane surface on the image side. Alternatively, as illustrated in FIG. 3, the front group GA may be composed of a negative meniscus lens with a convex surface on the object side, a plano-concave lens with its plane surface on the object side, a biconvex lens, and a positive meniscus lens with a convex surface on the image side, disposed in order from the object side, while the rear group GB may be composed of a biconvex lens, a biconcave lens, a biconvex lens, and a plano-convex lens with its plane surface on the image side, disposed in order from the object side.

The front group GA may be a lens group having a positive refractive power or a lens group having a negative refractive power. The rear group GB is preferably a lens group having a positive refractive power. For example, formation of the front group GA as a lens group having a positive refractive power and the rear group GB as a lens group having a positive refractive power is advantageous for downsizing, while formation of the front group GA as a lens group having a negative refractive power and the rear group GB as a lens group having a positive refractive power is advantageous for increasing the angle of view.

Further, the imaging lens of the present embodiment is configured to satisfy a conditional expression (1) given below. Configuration of the imaging lens so as not to fall to or below the lower limit of the conditional expression (1) allows a wider angle of view to be realized, whereby a wide angle of view range may be imaged.

$$2\omega > 130° \quad (1)$$

where $2\omega$: maximum total angle of view when an object at infinity is in focus.

Still further, the imaging lens preferably satisfies a conditional expression (2) given below:

$$10 < \nu Ar1 - \nu Ar2 < 60 \quad (2)$$

where $\nu Ar1$: Abbe number of the first lens from the image side in the front group with respect to the d-line, and $\nu Ar2$: Abbe number of the second lens from the image side in the front group with respect to the d-line.

Configuration of the imaging lens so as not to fall to or below the lower limit of the conditional expression (2) allows the longitudinal chromatic aberration correction effect of the first lens from the image side in the front group GA to be prevented from being insufficient and the lateral chromatic aberration correction effect of the second lens from the image side in the front group GA to be prevented from being insufficient, whereby longitudinal chromatic aberration and lateral chromatic aberration may be corrected satisfactorily. Configuration of the imaging lens so as not to reach or exceed the upper limit of the conditional expression (2) allows the longitudinal chromatic aberration correction effect of the first lens from the image side in the front group GA to be prevented from being excessive and the lateral chromatic aberration correction effect of the second lens from the image side in the front group GA to be prevented from being excessive, whereby longitudinal chromatic aberration and lateral chromatic aberration may be corrected satisfactorily. If the first and the second lenses from the image side in the front group GA are cemented, the aforementioned effects of the conditional expression (2) become more significant.

In order to further enhance the effect with respect to the upper limit of the conditional expression (2), while gaining the effect with respect to the lower limit of the conditional expression (2), the imaging lens more preferably satisfies a conditional expression (2-1) given below:

$$10 < \nu Ar1 - \nu Ar2 < 40 \tag{2-1}$$

Further, the imaging lens preferably satisfies a conditional expression (3) given below:

$$20 < \nu Bp - \nu Bn < 70 \tag{3}$$

where

νBp: Abbe number of the first lens from the object side in the rear group with respect to the d-line, and νBn: Abbe number of the second lens from the object side in the rear group with respect to the d-line.

Configuration of the imaging lens so as not to fall to or below the lower limit of the conditional expression (3) allows the longitudinal chromatic aberration correction effect of the first lens from the object side in the rear group GB to be prevented from being insufficient and the lateral chromatic aberration correction effect of the second lens from the object side in the rear group GB to be prevented from being insufficient, whereby longitudinal chromatic aberration and lateral chromatic aberration may be corrected satisfactorily. Configuration of the imaging lens so as not to reach or exceed the upper limit of the conditional expression (3) allows the longitudinal chromatic aberration correction effect of the first lens from the object side in the rear group GB to be prevented from being excessive and the lateral chromatic aberration correction effect of the second lens from the object side in the rear group GB to be prevented from being excessive, whereby longitudinal chromatic aberration and lateral chromatic aberration may be corrected satisfactorily. If the first and the second lenses from the object side in the rear group GB are cemented, the aforementioned effects of the conditional expression (3) become more significant.

In order to further enhance the aforementioned effects of the conditional expression (3), the imaging lens more preferably satisfies a conditional expression (3-1) given below:

$$30 < \nu Bp - \nu Bn < 60 \tag{3-1}$$

Still further, the imaging lens preferably satisfies a conditional expression (4) given below:

$$2 < (DAr1 + DAr2)/f < 4 \tag{4}$$

where

DAr1: center thickness of the first lens from the image side in the front group, DAr2: center thickness of the second lens from the image side in the front group, and f: focal length of the entire system.

Configuration of the imaging lens so as not to fall to or below the lower limit of the conditional expression (4) allows the distance on the optical axis from the aperture stop St to the most object side surface of the entire system to be suppressed, whereby the diameter of the most object side lens may be prevented from increasing and the lens system may be downsized. Configuration of the imaging lens so as not to reach or exceed the upper limit of the conditional expression (4) allows the overall lens length to be prevented from increasing.

In order to further enhance the effect with respect to the upper limit of the conditional expression (4), while gaining the effect with respect to the lower limit of the conditional expression (4), the imaging lens more preferably satisfies a conditional expression (4-1) given below:

$$2 < (DAr1 + DAr2)/f < 3.5 \tag{4-1}$$

Further, the imaging lens preferably satisfies a conditional expression (5) given below. Configuration of the imaging lens so as not to reach or exceed the upper limit of the conditional expression (5) allows the overall lens length to be reduced easily.

$$TL/f < 20 \tag{5}$$

where

TL: distance on the optical axis from the most object side surface of the front group to the image plane when an object at infinity is in focus, and f: focal length of the entire system.

As described above, according to imaging lenses of the embodiments of the present invention, an imaging lens having a wide angle of view, yet reduced in overall lens length, having a small F-number, suppressed in incident angle of a light ray incident on the image plane at a peripheral angle of view, and having high optical performance that conforms to image sensors of advanced pixel count may be realized. More specifically, the present invention is applicable, for example, to an imaging lens having eight to nine lenses in the entire system with a total angle of view of 180° or more and an F-number of about 2.5.

The aforementioned preferable configurations and possible configurations may be combined in any way and are preferably employed selectively, as appropriate, according to the specifications required.

Next, numerical examples of the imaging lens of the present invention will be described.

Example 1

The configuration of the imaging lens of Example 1 is as illustrated in FIG. 1. The imaging lens of Example 1 includes a front group GA having a positive refractive power, an aperture stop St, and a rear group GB having a positive refractive power, disposed in order from the object side. The front group GA is composed of a lens La1 to a lens La5, disposed in order from the object side, while the rear group GB is composed of a lens Lb1 to a lens Lb4, disposed in order from the object side. The lenses constituting the imaging lens of Example 1 are all spherical lenses.

Table 1 shows lens data of the imaging lens of Example 1. Specs with respect to the d-line are given in the upper margin of Table 1, in which f represents the focal length of the entire system, Bf represents the back focus in terms of air equivalent distance, FNo. represents the F-number, and 2ω represents the maximum total angle of view when an object at infinity is in focus.

The Si column in Table 1 indicates the $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of the $i^{th}$ surface and the Di column indicates the surface distance on the optical axis Z between the $i^{th}$ surface and the $(i+1)^{th}$ surface. The sign of the radius of curvature is positive if the surface shape is convex on the object side and negative if it is convex on the image side.

The Ndj column of Table 1 indicates the refractive index of the $j^{th}$ optical element with respect to the d-line (wavelength of 587.6 nm) in which a number j (j=1, 2, 3, - - - ) is given to each constituent element in a serially increasing manner toward the image side with the most object side constituent element being taken as the first element, and the vdj column indicates the Abbe number of the $j^{th}$ optical element with respect to the d-line. Note that the aperture stop St and the optical member PP are also included in the Table 1. In Table 1, the surface number column corresponding to the aperture stop St includes the word (St) in addition to the surface number and the surface number column corresponding to the image plane includes the word (Sim) in addition to the surface number.

In each table shown below, "degree" is used as the unit of angle, and "mm" is used as the unit of length. But, these are only examples and other appropriate units may also be used, as optical systems can be used by proportionally enlarged or reduced. Further, each table shown below indicates values rounded to a predetermined digit.

TABLE 1

Example 1
f = 2.005, Bf = 2.510, FNo. = 2.50, 2ω = 184.4

| Si | Ri | Di | Ndj | vdj |
|---|---|---|---|---|
| 1 | 17.42100 | 1.769 | 1.77250 | 49.60 |
| 2 | 6.92445 | 3.038 | | |
| 3 | 43.04671 | 0.844 | 1.58913 | 61.14 |
| 4 | 3.94358 | 2.547 | | |
| 5 | 6.89585 | 1.741 | 1.58313 | 59.38 |
| 6 | 2.44235 | 0.950 | | |
| 7 | 8.94000 | 3.002 | 1.76182 | 26.52 |
| 8 | −8.94000 | 1.891 | 1.58913 | 61.14 |
| 9 | −3.70010 | 0.186 | | |
| 10(St) | ∞ | 0.100 | | |
| 11 | 5.49844 | 2.131 | 1.58913 | 61.14 |
| 12 | −3.03300 | 0.650 | 1.80518 | 25.42 |
| 13 | 5.87829 | 0.315 | | |
| 14 | ∞ | 2.000 | 1.71299 | 53.87 |
| 15 | −5.67720 | 0.100 | | |
| 16 | 10.98490 | 2.500 | 1.77250 | 49.60 |
| 17 | ∞ | 1.188 | | |
| 18 | ∞ | 0.500 | 1.51680 | 64.20 |
| 19 | ∞ | 0.993 | | |
| 20(Sim) | ∞ | | | |

Figure 4:
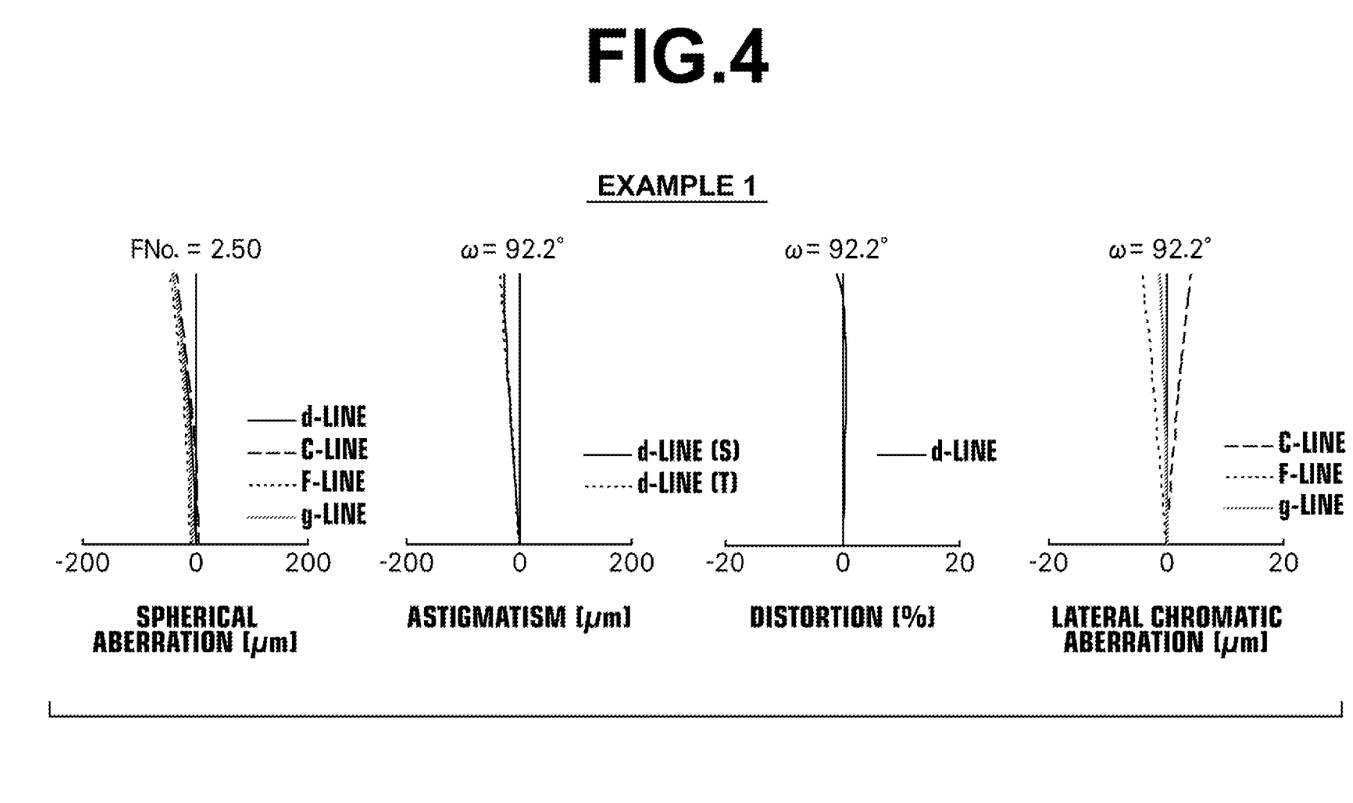
FIG. 4 shows aberration diagrams of the imaging lens of Example 1, in which diagrams of spherical aberration, astigmatism, distortion, and lateral chromatic aberration are arranged from the left in the drawing.

FIG. 4 shows aberration diagrams of the imaging lens of Example 1 when an object at infinity is in focus. In FIG. 4, aberration diagrams representing spherical aberration, astigmatism, distortion, and lateral chromatic aberration of the imaging lens of Example 1 are arranged in order from the left in the drawing. In the aberration diagram representing spherical aberration, aberrations with respect to the d-line (wavelength 587.6 nm), the C-line (wavelength 656.3 nm), F-line (wavelength 486.1 nm), and the g-line (wavelength 435.8 nm) are illustrated by the black solid line, the long broken line, the short broken line, and the gray solid line respectively. In the aberration diagram representing astigmatism, aberrations with respect to the d-line in the sagittal direction and the tangential direction are illustrated by the solid line and the short broken line respectively. In the aberration diagram representing distortion, distortion with respect to the d-line is illustrated by the solid line. In the aberration diagram representing lateral chromatic aberration, aberrations with respect to the C-line (wavelength 656.3 nm), F-line (wavelength 486.1 nm) and the g-line (wavelength 435.8 nm) are illustrated by the long broken line, the short broken line, and the gray solid line respectively. The "FNo." in the aberration diagram representing spherical aberration indicates the F-number, and "ω" in aberration diagrams representing the other aberrations indicates the half value (half angle of view) of the maximum total angle of view.

The illustration method, and the symbols of each data, their meaning, representation method, and the like described in Example 1 are applied also to the following examples unless otherwise specifically described, and duplicated description will be omitted herein below.

Example 2

The configuration of the imaging lens of Example 2 is as illustrated in FIG. 2. Note that, in the example illustrated in FIG. 2, two parallel plate optical members PP1 and PP2 are disposed between the most image side lens surface and the image plane Sim, instead of the optical member PP of the example illustrated in FIG. 1. The imaging lens of Example 2 includes a front group GA having a positive refractive power, an aperture stop St, and a rear group GB having a positive refractive power, disposed in order from the object side. The front group GA is composed of a lens La1 to a lens La5, disposed in order from the object side, while the rear group GB is composed of a lens Lb1 to a lens Lb4 disposed in order from the object side. The lenses constituting the imaging lens of Example 2 are all spherical lenses.

Figure 5:
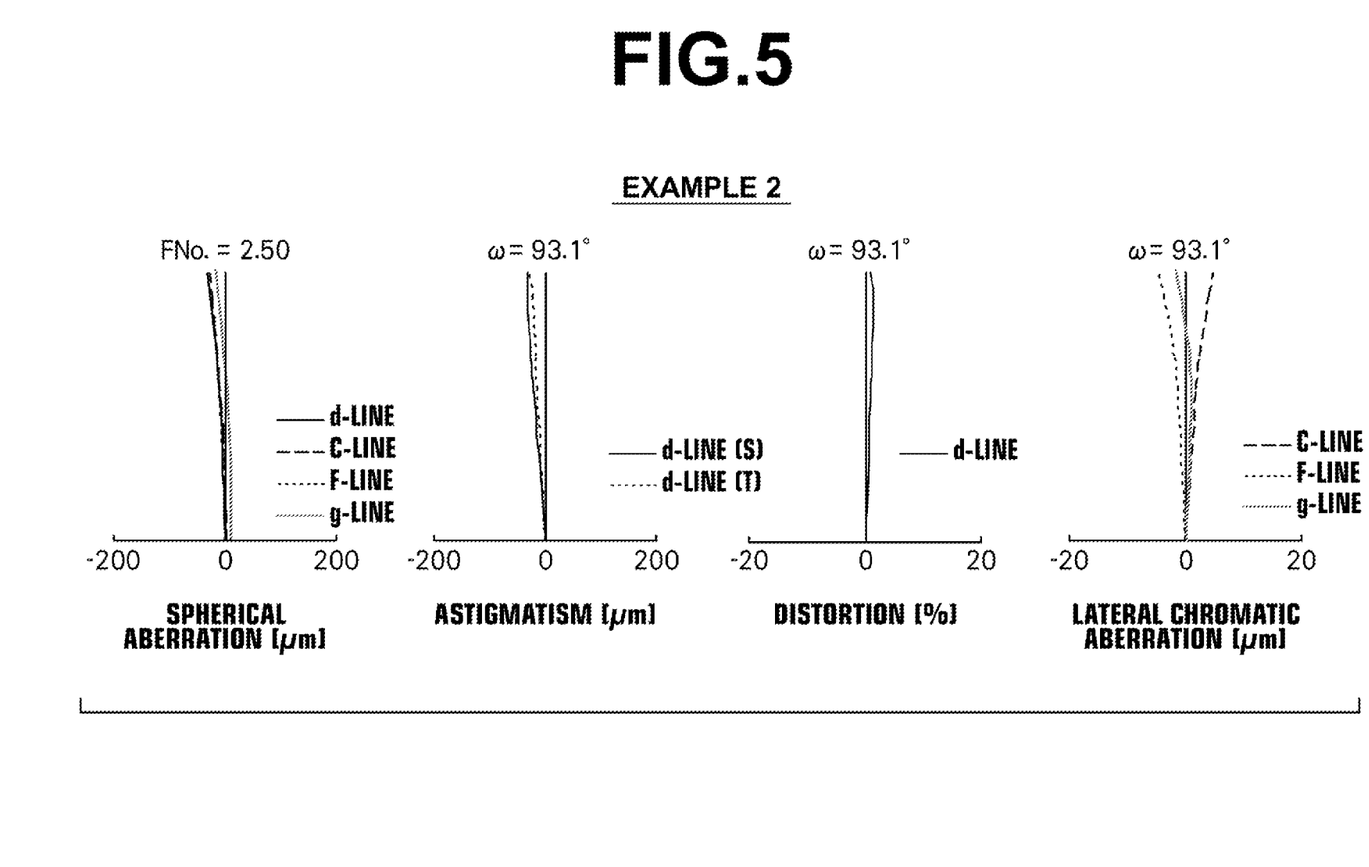
FIG. 5 shows aberration diagrams of the imaging lens of Example 2, in which diagrams of spherical aberration, astigmatism, distortion, and lateral chromatic aberration are arranged from the left in the drawing.

Table 2 shows lens data of the imaging lens of Example 2. FIG. 5 shows aberration diagrams of the imaging lens of Example 2 when an object at infinity is in focus. In FIG. 5, aberration diagrams representing spherical aberration, astigmatism, distortion, and lateral chromatic aberration of the imaging lens of Example 2 are arranged in order from the left in the drawing.

TABLE 2

Example 2
f = 1.951, Bf = 2.616, FNo. = 2.50, 2ω = 186.2

| Si | Ri | Di | Ndj | vdj |
|---|---|---|---|---|
| 1 | 17.87181 | 1.000 | 1.77250 | 49.60 |
| 2 | 6.95260 | 3.315 | | |
| 3 | 39.06166 | 2.000 | 1.58913 | 61.14 |
| 4 | 3.46891 | 2.541 | | |
| 5 | 7.97155 | 0.713 | 1.58913 | 61.14 |
| 6 | 2.72836 | 0.900 | | |
| 7 | 8.03777 | 2.833 | 1.90366 | 31.32 |
| 8 | −8.03777 | 2.260 | 1.58913 | 61.14 |
| 9 | −3.95128 | 0.100 | | |
| 10(St) | ∞ | 0.100 | | |
| 11 | 6.06997 | 2.110 | 1.58913 | 61.14 |
| 12 | −2.97518 | 0.600 | 1.84666 | 23.78 |
| 13 | 6.06600 | 0.302 | | |
| 14 | ∞ | 2.000 | 1.71299 | 53.87 |
| 15 | −5.50235 | 0.100 | | |
| 16 | 9.59296 | 1.900 | 1.77250 | 49.60 |
| 17 | ∞ | 0.500 | | |
| 18 | ∞ | 1.000 | 1.51680 | 64.20 |
| 19 | ∞ | 0.500 | | |
| 20 | ∞ | 0.500 | 1.51680 | 64.20 |
| 21 | ∞ | 0.628 | | |
| 22(Sim) | ∞ | | | |

Example 3

The configuration of the imaging lens of Example 3 is as illustrated in FIG. 3. Note that, in the example illustrated in FIG. 3, two parallel plate optical members PP1 and PP2 are disposed between the most image side lens surface and the image plane Sim, instead of the optical member PP of the example illustrated in FIG. 1. The imaging lens of Example 3 includes a front group GA having a positive refractive power, an aperture stop St, and a rear group GB having a positive refractive power, disposed in order from the object side. The front group GA is composed of a lens La1 to a lens La4, disposed in order from the object side, while the rear group GB is composed of a lens Lb1 to a lens Lb4 disposed in order from the object side. The lenses constituting the imaging lens of Example 3 are all spherical lenses.

Figure 6:
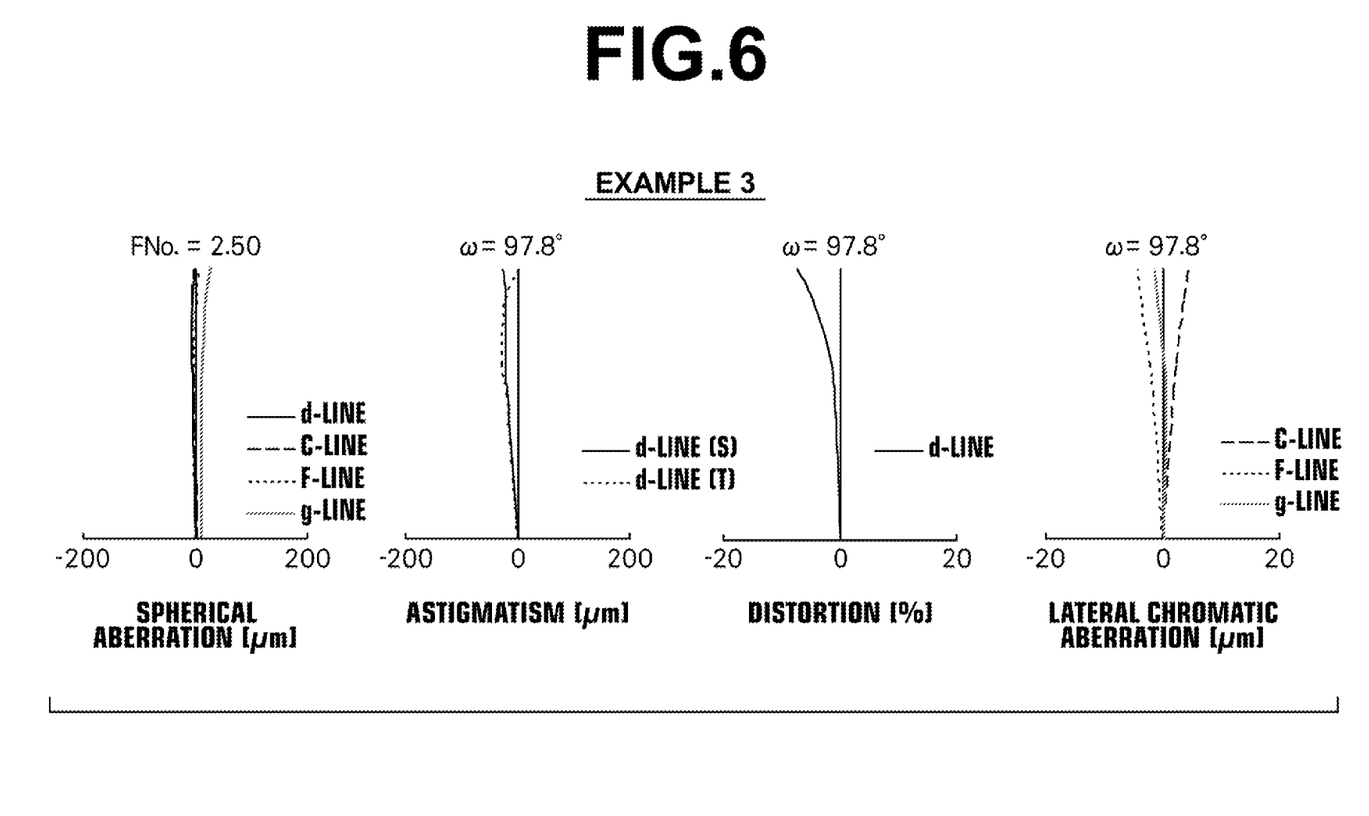
FIG. 6 shows aberration diagrams of the imaging lens of Example 3, in which diagrams of spherical aberration, astigmatism, distortion, and lateral chromatic aberration are arranged from the left in the drawing.

Table 3 shows lens data of the imaging lens of Example 3. FIG. 6 shows aberration diagrams of the imaging lens of Example 3 when an object at infinity is in focus. In FIG. 6, aberration diagrams representing spherical aberration, astigmatism, distortion, and lateral chromatic aberration of the imaging lens of Example 3 are arranged in order from the left in the drawing.

TABLE 3

Example 3
f = 2.022, Bf = 3.011, FNo. = 2.50, 2ω = 195.6

| Si | Ri | Di | Ndj | νdj |
|---|---|---|---|---|
| 1 | 17.60950 | 1.888 | 1.77250 | 49.60 |
| 2 | 4.95260 | 3.027 | | |
| 3 | ∞ | 0.800 | 1.61800 | 63.33 |
| 4 | 3.26700 | 3.305 | | |
| 5 | 15.97196 | 3.004 | 1.84666 | 23.78 |
| 6 | −15.97196 | 3.000 | 1.80100 | 34.97 |
| 7 | −6.54736 | 0.100 | | |
| 8(St) | ∞ | 0.100 | | |
| 9 | 4.13306 | 2.110 | 1.49700 | 81.54 |
| 10 | −4.13306 | 0.600 | 1.84666 | 23.78 |
| 11 | 5.34233 | 0.242 | | |
| 12 | 43.66346 | 2.000 | 1.62230 | 53.17 |
| 13 | −5.14160 | 0.100 | | |
| 14 | 8.33153 | 2.500 | 1.72916 | 54.68 |
| 15 | ∞ | 0.500 | | |
| 16 | ∞ | 1.000 | 1.51680 | 64.20 |
| 17 | ∞ | 0.500 | | |
| 18 | ∞ | 0.500 | 1.51680 | 64.20 |
| 19 | ∞ | 1.022 | | |
| 20(Sim) | ∞ | | | |

Table 4 summarizes values corresponding to the conditional expressions (1) to (5) for each of Examples 1 to 3. The values shown in Table 4 are those based on the d-line.

TABLE 4

| Expression No. | | Example 1 | Example 2 | Example 3 |
|---|---|---|---|---|
| (1) | 2ω | 184.4 | 186.2 | 195.6 |
| (2) | νAr1 − νAr2 | 34.62 | 29.82 | 11.19 |
| (3) | νBp − νBn | 35.72 | 37.36 | 57.76 |
| (4) | (DAr1 + DAr2)/f | 2.44 | 2.61 | 2.97 |
| (5) | TL/f | 13.11 | 13.01 | 12.75 |

As is known from the above data, the imaging lenses of Examples 1 to 3, each consisting of eight or nine lenses as the entire system, are reduced in overall lens length, yet having wide angle configurations with maximum total angles ranging from 180° to 200°, having a small F-number of 2.50, suppressed in incident angle of a light ray incident on the image plane Sim at a peripheral angle of view, and realizing high optical performance with various types of aberrations being corrected satisfactorily.

The imaging lens according to the present embodiment may be preferably used in imaging devices such as, for example, digital cameras, surveillance cameras, and vehicle cameras, in addition to be used as an interchangeable lens for various types of cameras. Next, an imaging apparatus according to an embodiment of the present invention will be described with reference to FIG. 7. As an example of the imaging apparatus of an embodiment of the present invention, FIG. 7 schematically illustrates an imaging apparatus 10 that uses an imaging lens according to an embodiment of the present invention.

Figure 7:
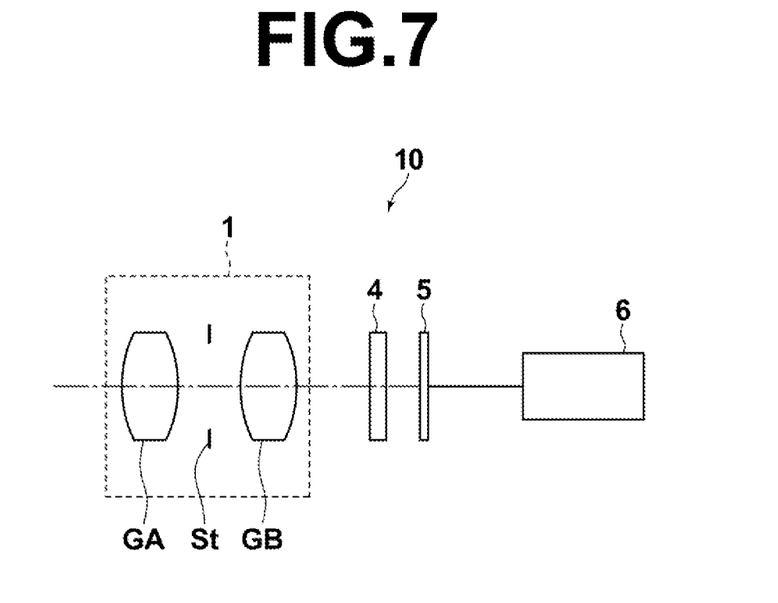
FIG. 7 is a schematic configuration diagram of an imaging apparatus of the present invention.

The imaging apparatus 10 shown in FIG. 7 includes an imaging lens 1, a filter 4 disposed on the image side of the imaging lens 1, an image sensor 5 that captures an image of a subject formed by the imaging lens 1, and a signal processing section 6. Note that the imaging lens 1 shown in FIG. 7 conceptually illustrates an example and does not show the detailed configuration of the imaging lens of the present invention.

The image sensor 5 captures a subject image formed by the imaging lens 1 and converts the captured image to an electrical signal, and is disposed such that the imaging surface of the image sensor corresponds to the image plane of the imaging lens. For example, a CCD (Charge Coupled Device), a CMOS (Complementary Metal Oxide Semiconductor), or the like may be used as the image sensor 5. A signal outputted from the image sensor 5 is arithmetically processed by the signal processing section 6.

So far, the present invention has been described by way of embodiments and Examples, but it should be understood that the present invention is not limited to the embodiments and Examples described above, and various changes and modifications may be made. For example, values of radius of curvature, surface distance, refractive index, and Abbe number of each lens are not limited to those shown in each Numerical Example and may take other values.

What is claimed is:

1. An imaging lens, substantially consisting of a front group, a stop, and a rear group disposed in order from the object side, wherein:
    the first and the second lenses from the object side in the front group are a negative meniscus lens with a convex surface on the object side and a negative lens respectively;
    the first and the second lenses from the image side in the front group are both positive lenses;
    the first and the second lenses from the object side in the rear group are a positive lens and a negative lens respectively;
    the rear group includes one or more lenses on the image side of the second lens from the object side, the one or more lenses being both positive lenses; and
    the imaging lens satisfies a conditional expression (1) given below:

$$2\omega > 130° \quad (1)$$

where
    2ω: maximum total angle of view when an object at infinity is in focus.

2. The imaging lens as claimed in claim 1, wherein the rear group is composed of a positive lens, a negative lens, a positive lens, and a positive lens, disposed in order from the object side.

3. The imaging lens as claimed in claim 1, wherein the first and the second lenses from the image side in the front group are cemented with each other.

4. The imaging lens as claimed in claim 1, wherein the first lens from the image side in the front group is a positive meniscus lens with a convex surface on the image side.

5. The imaging lens as claimed in claim 1, wherein the imaging lens satisfies a conditional expression (2) given below:

$$10 < vAr1 - vAr2 < 60 \qquad (2)$$

where
- vAr1: Abbe number of the first lens from the image side in the front group with respect to the d-line, and
- vAr2: Abbe number of the second lens from the image side in the front group with respect to the d-line.

6. The imaging lens as claimed in claim 5, wherein the imaging lens satisfies a conditional expression (2-1) given below:

$$10 < vAr1 - vAr2 < 40 \qquad (2\text{-}1).$$

7. The imaging lens as claimed in claim 1, wherein the first and the second lenses from the object side in the rear group are cemented with each other.

8. The imaging lens as claimed in claim 1, wherein the imaging lens satisfies a conditional expression (3) given below:

$$20 < vBp - vBn < 70 \qquad (3)$$

where
- vBp: Abbe number of the first lens from the object side in the rear group with respect to the d-line, and
- vBn: Abbe number of the second lens from the object side in the rear group with respect to the d-line.

9. The imaging lens as claimed in claim 8, wherein the imaging lens satisfies a conditional expression (3-1) given below:

$$30 < vBp - vBn < 60 \qquad (3\text{-}1).$$

10. The imaging lens as claimed in claim 1, wherein the imaging lens satisfies a conditional expression (4) given below:

$$2 < (DAr1 + DAr2)/f < 4 \qquad (4)$$

where
- DAr1: center thickness of the first lens from the image side in the front group,
- DAr2: center thickness of the second lens from the image side in the front group, and
- f: focal length of the entire system.

11. The imaging lens as claimed in claim 10, wherein the imaging lens satisfies a conditional expression (4-1) given below:

$$2 < (DAr1 + DAr2)/f < 3.5 \qquad (4\text{-}1).$$

12. The imaging lens as claimed in claim 1, wherein the imaging lens satisfies a conditional expression (5) given below:

$$TL/f < 20 \qquad (5)$$

where
- TL: distance on the optical axis from the most object side surface of the front group to the image plane when an object at infinity is in focus, and
- f: focal length of the entire system.

13. The imaging lens as claimed in claim 1, wherein the front group is composed of a negative meniscus lens, a negative lens, a negative lens, a positive lens, and a positive lens, disposed in order from the object side.

14. An imaging apparatus equipped with the imaging lens as claimed in claim 1.

* * * * *